United States Patent
Monette et al.

(10) Patent No.: US 7,706,265 B2
(45) Date of Patent: Apr. 27, 2010

(54) DECENTRALIZED NODE, ACCESS EDGE NODE, AND ACCESS NODE FOR AGGREGATING DATA TRAFFIC OVER AN ACCESS DOMAIN, AND METHOD THEREOF

(75) Inventors: Sylvain Monette, Stockholm (SE); Mathieu Giguere, Vaudreuil-sur-le-Lac (CA); Martin Julien, Laval (CA); Benoit Tremblay, Laval (CA)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 342 days.

(21) Appl. No.: 11/589,230

(22) Filed: Oct. 30, 2006

(65) Prior Publication Data

US 2008/0101343 A1 May 1, 2008

(51) Int. Cl.
*H04L 12/26* (2006.01)
*H04L 12/66* (2006.01)
*H04L 12/56* (2006.01)

(52) U.S. Cl. .................. 370/230; 370/352; 370/401

(58) Field of Classification Search .............. 370/230, 370/235, 351, 352, 355, 395.53, 401
See application file for complete search history.

(56) References Cited

U.S. PATENT DOCUMENTS 5,959,989 A * 9/1999 Gleeson et al. ............. 370/390
2003/0123453 A1 * 7/2003 Ooghe et al. ............ 370/395.53
2005/0152271 A1 * 7/2005 Rindborg et al. ............ 370/230
2006/0182123 A1 * 8/2006 Monette et al. ........ 370/395.53
2007/0081519 A1 * 4/2007 Ramaswamy et al. ....... 370/352

FOREIGN PATENT DOCUMENTS

WO 01/14990 A1 3/2001
WO 2006/085233 A2 8/2006

OTHER PUBLICATIONS

R. Boutaba et al., A Generic Platform for Scalable Access to Multimedia-on-Demand Systems, IEEE 1999.
International Search Report from corresponding PCT application PCT/IB2007/054254.

* cited by examiner

Primary Examiner—Hong Cho

(57) ABSTRACT

The present invention relates to a method, an access node, an access edge node and a decentralized node for aggregating data traffic over an access domain. The decentralized node corresponds to one of the service providers, and is located in closer proximity with user domains to be serviced. The decentralized node maintains over the access domain one or several Virtual Local Area Networks, for aggregating thereon data traffic to be exchanged with the user domains, on behalf of the service provider domain. To allow proper aggregation of the data traffic, service bindings are created and stored at the access edge node, and further stored at the decentralized node and at the access node. Therefore, aggregation of the data traffic between the decentralized node and the user domains over the access domain is performed in accordance with the created service bindings.

13 Claims, 8 Drawing Sheets

Service Agents mngt and Control Unit 442

| Service Agent | Service Type | Properties | Service Provider Domain Port | Decentralized nodes |
|---|---|---|---|---|
| SA | Service A | $Bw_1$, $Q_oS_2$, $IP_{v4}$ | Port XXY | Nodes A,B |
| $SA_1$ | Service B | $Q_oS_1$, $Bw_2$ | Port XYZ | Node C |
| $SA_2$ | Service A | $Bw_2$, $Q_oS_2$, $IP_{v6}$ | Port XXY | ... |
| ... | ... | ... | ... | ... |

Service Bindings Hosting Unit

| SA ID | Service Type | User MAC info | User port on access node | User network context | Access Node MAC | Dec. Node MAC |
|---|---|---|---|---|---|---|
| SA$_1$ | Service A | MAC add 1 | Port ABC | Local identifier X | AN$_1$ MAC | MAC$_1$ |
| SA$_2$ | Service C | MAC add 2 | Port AAB | Local identifier Y | AN$_1$ MAC | --- |
| SA$_3$ | Service B | MAC add 3 | Port ABA | Local identifier Z | AN$_2$ MAC | MAC$_2$ |
| ... | ... | ... | ... | ... | ... | ... |

Transport Primitives

FIG. 5B

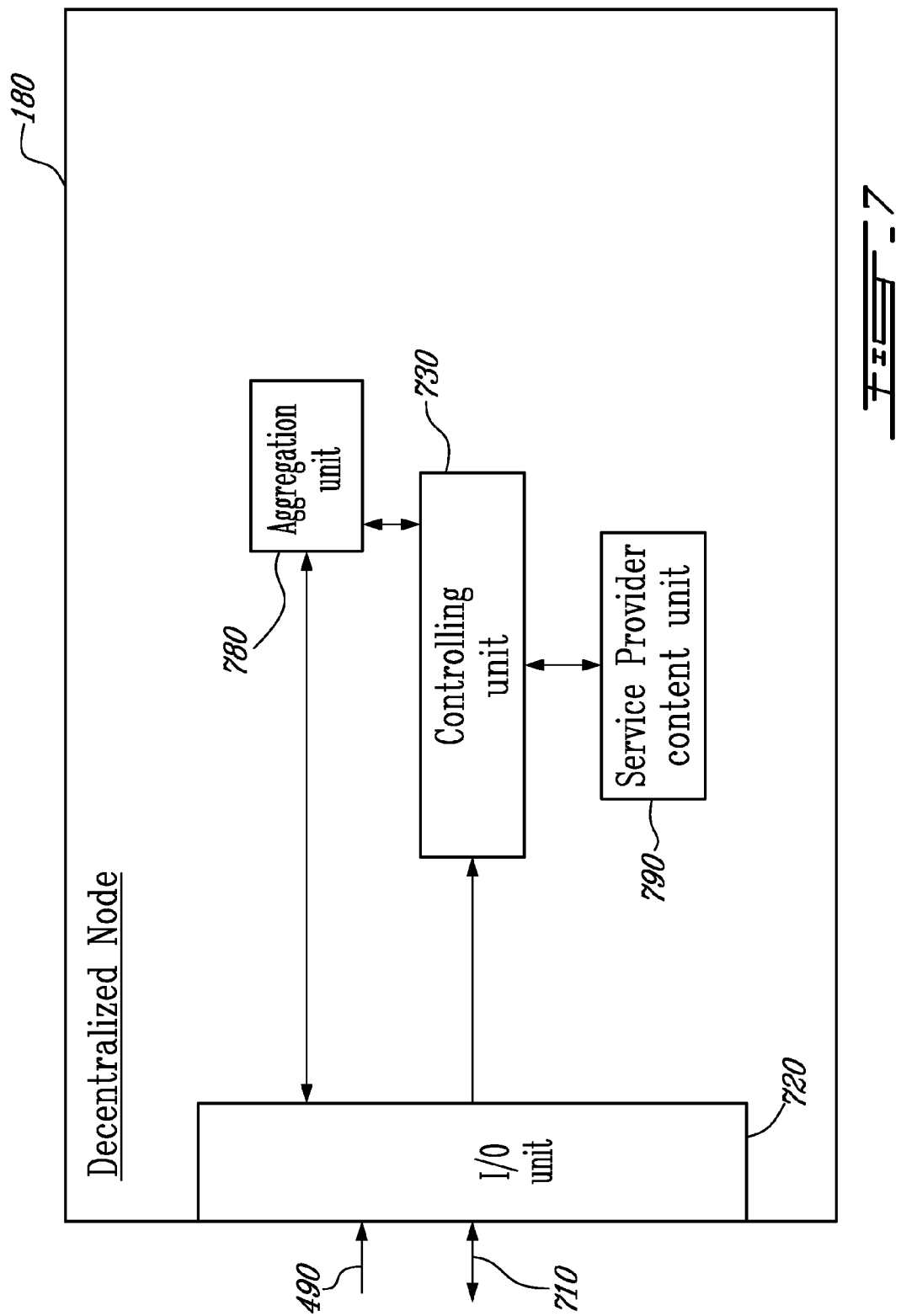

US 7,706,265 B2

DECENTRALIZED NODE, ACCESS EDGE NODE, AND ACCESS NODE FOR AGGREGATING DATA TRAFFIC OVER AN ACCESS DOMAIN, AND METHOD THEREOF

TECHNICAL FIELD

The present invention relates to aggregating data traffic over an access domain, and more particularly aggregating data traffic by a decentralized node and by an access node.

BACKGROUND

Recent years have seen the explosion of Internet Protocol (IP) networks. Initially developed to allow universities and researchers to communicate and cooperate in research projects, it has grown into networks offered at a mass-market level. Nowadays, it is normal for households to have a connection to an IP network to surf the world-wide-web, play interactive games, carry Voice over IP, download documents and softwares, make electronic business transactions, etc.

Reference is now made to FIG. 1, which represents a prior art example of an IP network 100. Typically, an IP network is composed of an access domain 115, network service provider domains 140 and application service provider domains 150. The access domain 115 includes Access Nodes (AN) 120 and an access network 130, which may itself be an IP sub-network. The ANs 120 are access providers, which can offer access to the IP network 100 to user domains 110. The user domains 110 include for example User Devices (UDs) (such as computers, mobile phones, personal digital assistants, etc.), Local Area Networks (LANs) and Wireless-LANs (W-LANs). The user domains communicate with the ANs over various possible technologies. Amongst those technologies can be found dial-up connections and Asymmetric Distribution Subscriber Line connections over telephone lines, cable modems connecting over television cable networks, or wireless communications. The access network 130 is composed of a group of independent switches and routers, which task is to switch/route incoming data traffic based on a destination address embedded therein. As for the network service provider domains 140, they may correspond for example to Voice over IP services, while the application service provider domains 150 may correspond to electronic banking and electronic business transactions.

Though FIG. 1 depicts three user domains, two Access Nodes, two service provider domains and two application service domains, IP networks 100 typically include several thousands of user domains, hundreds of Access Nodes, hundreds of network service provider domains and application service provider domains. As to the access network 130, it is common to encounter networks including hundreds of switches and/or routers. It is thus understood that FIG. 1 depicts a highly simplified IP network 100 for clarity purposes.

The initial principle at the basis of IP networks is to rely on routers, which perform as few and as little operations as possible before routing incoming data traffic towards their final destination. In application, such a principle results in "best effort" networks that result in a trade-off between quality of service and quantity of data traffic. An increased quality of service, for the same number of routers results in a lower quantity of data traffic being transported on those routers. Hence, IP networks have not been designed bearing in mind higher level of quality of service. For those reasons, IP networks have difficulty supporting data traffic for network service provider domains and application service provider domains that require a higher quality of service, and especially more so with the current explosion of user domains.

There is currently no known end-to-end solution to allow IP networks to support a broad range of quality of services, with the increasing number of user domains and network service provider domains and application service provider domains exchanging data traffic. Furthermore, no long-term solution has been identified to allow a tangible and non-destructive solution to the need of increased Quality of Service (QoS) for certain services and applications.

Accordingly, it should be readily appreciated that in order to overcome the deficiencies and shortcomings of the existing solutions, it would be advantageous to have a decentralized node, an access node, and an access edge node, along with a method, for efficiently transporting aggregated data traffic between service providers and end-users over an access domain. It would also be an advantage to have a method and nodes that allow for a coordinated usage of the access network while providing various levels of quality of service. The present invention provides such a method and nodes.

SUMMARY

The present invention provides an access edge node, a decentralized node, an access node, and a method for efficiently aggregating data traffic over an access domain, and for coordinating usage of the access network while providing various levels of quality of service.

More specifically, in a first aspect, the present invention is directed to an access edge node for aggregating data traffic over an access domain. The access network is for carrying data traffic between user domains and at least one decentralized node corresponding to a service provider domain. The access edge node includes a service agent unit, a service bindings unit, an input/output unit, and a controlling unit. The service agent unit hosts service agents, where each of the service agents corresponds to one of the service provider domains. The service agent unit also maintains through the at least one decentralized node at least one Virtual Local Area Network over the access network. The service bindings unit hosts existing service binding information, where each of the service binding information includes identity of one of the service agents, user domain information, decentralized node information and transport primitives, together forming a transport relationship. As for the input/output unit, it communicates with the service provider domains, with the access domain, the at least one decentralized node and with access nodes providing access to the access domain to the user domains. The input/output unit further receives service request related messages. Each of the service request related messages identifies one of the service provider domains and one of the user domains. Finally, the controlling unit determines, upon receipt of a service request related message at the input/output unit, whether one of the service agents corresponds to the service provider domains identified therein, and if so, creates a corresponding service binding in the service bindings unit and informs an access node serving the user domain identified in the service request message and a corresponding decentralized node to aggregate data traffic related to the received service request message in accordance with the created service binding.

In another aspect, the present invention is directed to a method for performing aggregation of data traffic over an access network carrying data traffic between a plurality of service provider domains and user domains. The method comprises a step of establishing a plurality of service agents in an access edge node, each of the service agents corresponding to one of the service provider domains. For each service provider domain, the method maintains a Virtual Local Area Network over the access domain. Upon reception at the access edge node of a service request related message identifying one of the service provider domains and one of the user domains, it is determined whether one of the established service agents corresponds to the required service provider domain. If one of the established service agents corresponds to the identified service provider domain, the method creates at the access edge node a service binding for the received service request related message, which includes an identity of the corresponding service agent, identified user domain information and access domain transport primitives. The method then informs an access node responsible for providing access to the identified user domain to the access domain and a decentralized node corresponding to the service provider domain of the creating of the service binding. Aggregation of data traffic between the identified user domain and the corresponding decentralized node is then made in accordance with the created service binding.

In a further aspect, the present invention is directed towards a decentralized node for aggregating data traffic over an access network carrying data traffic between user domains and service provider domains. A given decentralized node may for instance correspond to one of the service provider domains. For aggregating data traffic, the decentralized node includes an input/output unit, an aggregation unit, a service provider content unit and a controlling unit. It is the input/output unit that receives and sends data traffic over the access network. The aggregation unit stores information on existing service bindings over the access network for the corresponding service provider domain. Such information includes for each service binding an identification of the service binding and identity of a user domain. The aggregation unit further contains information regarding one or multiple Virtual Local Area Networks (VLAN), spanning through the access network, over which the data traffic is to be aggregated in accordance with the established service binding. The service provider content unit stores and manages data related to the corresponding service provider domain. Finally, the controlling unit handles data traffic exchange in accordance with the established service bindings by: i) identifying in the aggregation unit a corresponding one of the service bindings, ii) identifying a corresponding one of the VLANs, and iii) instructing the input/output unit to aggregate the data related to the corresponding service provider domain stored in the service provider content unit in accordance to the identified service binding over the identified VLAN.

In a still further aspect, the present invention is directed towards an access node for aggregating data traffic over an access domain. The access domain carries data traffic between user domains, service provider domains and decentralized nodes corresponding to the service provider domains. The access node first comprises an input/output unit for receiving data traffic from the user domains and for forwarding data traffic received from the user domains over the access domain. In the access node, an aggregation unit stores information on existing service bindings over the access domain, the information including for each service binding an identification of the service binding, identity of a user domain, with an identity of a VLAN over the access domain corresponding to a service provider domain and to a decentralized node corresponding to the service provider domain. The access node then comprises a controlling unit for determining, upon receipt of data traffic from one of the user domains whether that data traffic corresponds to one of the existing service bindings by comparing an identity related to the received data traffic with user domain identities in the aggregation unit. If the received user domain identity corresponds to one of the existing service bindings, the controlling unit determines an aggregation endpoint for upstream traffic of the corresponding service binding. The aggregation endpoint of the received data traffic may either be an access edge node or the decentralized node. The controlling unit of the access node then informs the input/output unit to aggregate that received data traffic over the access domain in accordance with the aggregation endpoint.

BRIEF DESCRIPTION OF THE DRAWINGS

For a more detailed understanding of the invention, for further objects and advantages thereof, reference can now be made to the following description, taken in conjunction with the accompanying drawings, in which:

FIG. 5a is an exemplary tabular representation of the content of a service agents management and control unit in accordance with the present invention;

FIG. 5b is an exemplary tabular representation of the content of a service bindings hosting unit in accordance with the teachings of the present invention;

FIG. 7 is a schematic representation of a decentralized node in accordance with the teachings of the present invention.

DETAILED DESCRIPTION

Figure 1:
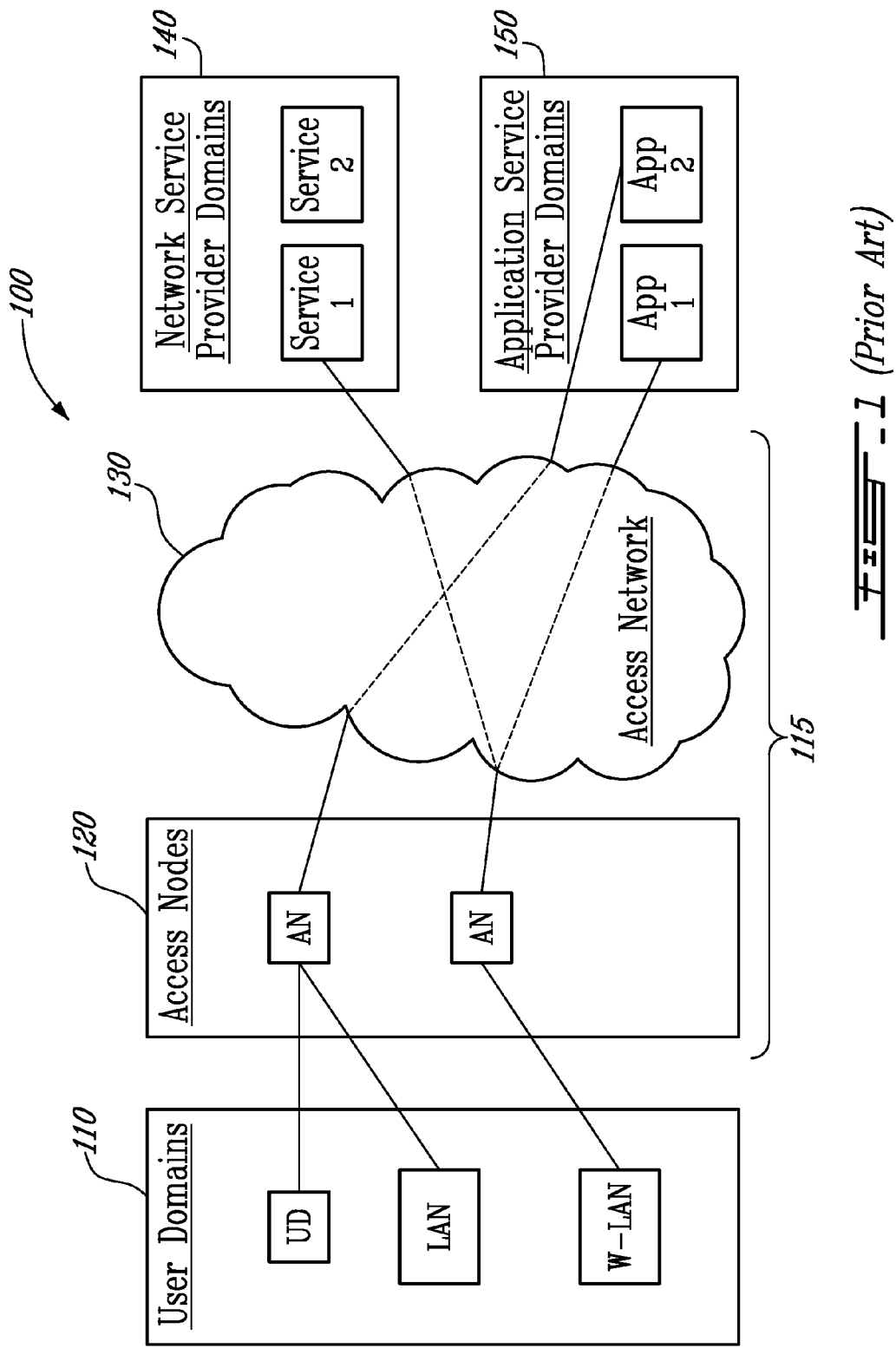
FIG. 1 is a prior art example of an IP network.

The innovative teachings of the present invention will be described with particular reference to various exemplary embodiments. However, it should be understood that this class of embodiments provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several views.

The present invention provides a method and nodes for aggregating data traffic over an access domain, and more particularly for aggregating data traffic by a decentralized node. For doing so, an access edge node and a decentralized node are introduced within the access domain, between the user domains and the service provider domains.

The decentralized node acts as a cache which stores information and may provide this information to end users on behalf of a given service provider domain. In an exemplary use, the service provider may be a video-on-demand (VOD) supplier. When an end-user makes a request to watch a movie, data would normally be sent from the VOD supplier through the access domain towards the access node serving the end-user. When a given movie is in high demand and many end-users are expected to be requesting the same movie, the decentralized node may advantageously store a copy of the movie data in close proximity to the access nodes. As a result, the path traveled by the movie data between the decentralized node and the access nodes is reduced, rendering control of Quality of Service (QoS) parameters more efficient. Terms such as 'aggregation' and 'aggregating' as used herein express the fact that traffic is sent according to a service binding.

In a general case, a given decentralized node corresponds to one service provider domain. More than one decentralized node may however correspond to one service provider domain, and the same decentralized node may also correspond to more than one service provider domain. Relationship between decentralized nodes and service provider domains is defined by configuration of the access domain.

The access edge node includes a service agent unit, which manages and controls service agents. Each of the service agents corresponds on one hand to one of the service provider domains, and on the other hand manages and controls therefor a Virtual Local Area Network (VLAN) over the access domain. Whenever a user domain wishes to communicate with a selected one of the service provider domains, a service request related message is sent to the access edge node. The service request related message includes information identifying one of the service provider domains and one of the user domains. The access edge node determines whether one of the service agents correspond to the service provider domain identified in the service request related message, and if so creates a service binding for the received service request related message, unless an already existing service binding corresponds to the service request related message. The service binding identifies the decentralized node, user domain information and access domain transport primitives, together forming a transport relationship. Then, an access node serving the requesting user domain and the identified decentralized node are informed of the creation of the service binding. Delivery of aggregated data traffic related to the service request related message is performed by the decentralized node over the access domain in accordance with the created service binding. In effect, when downstream payload intended for the end user is sent from the decentralized node, the decentralized node, based on the presence of the service binding, replaces a destination address included in the payload, the destination address initially pointing to the end user domain, by an address of the access node. As a result, the payload is sent by the decentralized node to the access node as if the access node was the final destination. The access node, based on the presence of the service binding and using additional data of the service binding included in the payload, makes a translation to recuperate the user domain address and uses a result of the translation to forward the payload to the end user domain. In the opposite direction, upstream data, that is payload initiated by the end user device, arrives at the access node carrying a destination address pointing to the application server. Because of the presence of the service binding, the access node substitutes this destination address with a new destination address pointing either to the access edge node or to the decentralized node, depending on parameters such as, for example, QoS parameters related to the service binding. Additional components of the service binding may be included along with the payload in order to enable the access edge node, if this is the selected destination, to recuperate the proper destination address from the service binding and forward the payload to the application server as the final destination. In cases where the decentralized node is the destination set by the access node, the decentralized node is in effect the final destination. Aggregation refers to the fact that payload from or to any number of users, attached to the same access node and receiving service from the same service provider, possibly through a decentralized server, is exchanged between the access node on one hand, and the access edge node or decentralized node on the other hand, in both directions, according to transport primitives defined by the service binding for which QoS parameters are guaranteed. The following paragraphs will provide a more detailed explanation of how service agents, service bindings, the decentralized node, the access edge node and access node are woven together so as to deliver aggregated data traffic over the access domain.

The expression "data traffic" is used throughout the present specification and relates to messages and information transferred over a data network.

Figure 2:
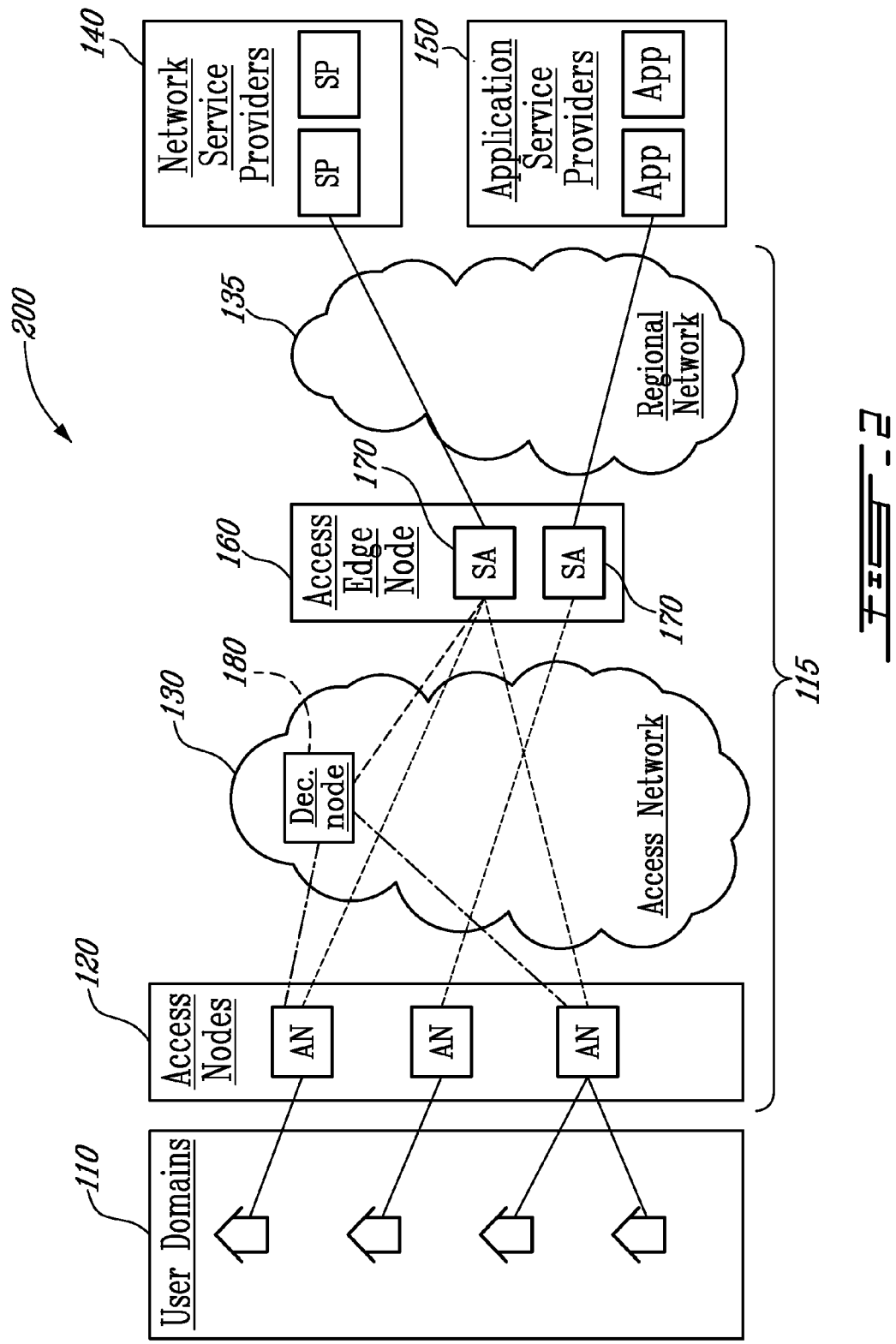
FIG. 2 is a schematic exemplifying a network in which the present invention has been incorporated.

To understand the present invention and its inventive mechanisms, reference is now made to FIG. 2, which is a schematic exemplifying a network 200 in which the present invention has been incorporated. The schematic representation of the network 200 has been simplified for clarity purposes, and the various elements depicted have been grouped by similar functions rather than graphically representing geographical network entities. However, each group of similar functions would typically correspond to a multitude of physical network entities performing those specific functions, geographically scattered throughout the network 200. The schematic representation of the network 200 includes user domains 110, an access domain 115 (including: access nodes 120, an access network 130, an access edge node 160 and a regional network 135), network service providers 140, and application service providers 150. An exhaustive description and examples for each of those elements will be provided in the following paragraphs, with continued reference to FIG. 2.

Turning now to the access domain 115, it is possible to summarize its function as a means to provide end-to-end access between the user domains 110 and the network service providers 140 and application service providers 150. The access domain includes the access nodes 120, the access network 130, the regional network 135 and the access edge node 160. Thus, the access domain 115 is not an entity per se; it is rather a group of components, which when interconnected together either directly or indirectly, act as a domain for providing access, hence its name "access domain". It should thus be clear that the current representation of the access domain 115 including only one access node 120, one access network 130, one access edge node 160 and one regional network 135 does not mean that such entities are found singly in the access domain, but rather that for sake of clarity only one such entity is represented. The following paragraphs explain in greater details the various components of the access domain.

The access nodes 120, which also include access gateways (not shown), represent the first component of the access domain 115. The access nodes 120 typically refer to access providers, which allow user domains 110 access to the access network 130, upon, for example, subscription or pay-per-usage basis. Such access can be made possible using various mediums and technologies. Amongst the possible mediums are for example cable, landline phone, and wireless phone. As to the possible technologies, Integrated Services Digital Network (ISDN) and Asymmetric Digital Subscriber Line (ADSL), Worldwide Interoperability for Microwave Access (WiMax) are examples of technologies that can be used. However, it should be noted that the present invention is not limited to those mediums or technologies. Also, even though only three access nodes have been depicted, it should be noted that the network 200 potentially includes hundreds or thousands of access nodes.

The access domain also includes the access network 130 and the regional network 135 which will be discussed together. The primary function of the access network 130 and the regional network 135 is to provide end-to-end, and independent transport between the access nodes 120 on one hand, and the network service providers 140 and the application service providers 150 on the other hand. The access network 130 and regional network 135 are networks capable of tasks such as switching and routing downstream and upstream data traffic. The access network 130 is preferably capable of using Ethernet, or other similar protocols, which correspond to the Layer 2 of the Open Systems Interconnection (OSI) Reference Model, but is not limited thereto. It could advantageously be capable of supporting IPv4 and/or IPv6 for example, or any other protocol. The regional network 135 preferably supports Ethernet and/or Internet Protocol (IP), and possibly other Layer 3 capable protocols. Furthermore, it should be noted that the access network 130 and the regional network 135 could be operated and/or managed by a single operator or by many different operators.

It is through a tight coupling of their traffic-engineering capabilities through the access edge node 160, that the access network 130 and the regional network 135 can provide end-to-end Quality of Service (QoS). The role of the access edge node 160 is the creation, management and hosting of service agents 170 and service bindings. Each of the service agents 170 corresponds to one of the service provider domains (140 or 150), and manages and controls therefor a Virtual Local Area Network (VLAN) over the access network 130. The expression "service binding" refers to a binding between the user domain 110 and one of the network service provider domain 140 or one of the application service provider domain 150. The access edge node and the concepts of service agents and service bindings will be described in further detail in the description referring to FIGS. 4, 5a and 5b.

Turning now to the user domains 110, the latter rely on the access domain 115 for handling end-to-end communication with the network service providers 140 and the application service providers 150. It should be noted that in the present description, use of the word "domain" refers to one or multiple network elements sharing similar functional features. Thus, in the context of the present invention, the expression "user domains" may refer to independent computers, local networks of computers connected through a router either physically or wirelessly, wireless phones, Personal Digital Assistants (PDAs), and all other devices that are capable of data communication over a data network such as network 200. Additionally, the expression "user domain" is intended to also include multiple simultaneous data traffic sessions performed with a multitude of devices, through one single user port. For example, a user could concurrently access different applications and network services such as Internet access, video conferencing, and television programs with one or multiple devices through a user domain located VLAN, or one single user port referred to herein as "user domain".

The network service providers 140 refer to entities that use the access domain 115 to provide IP addressing and connectivity to another IP network, and to offer and deliver specific application. In the context of data traffic with the user domains 110, the network service providers 140 typically own and assign IP addresses to the user domains 110, using identification based on for example Remote Authentication Dial-In User Service (RADIUS). The network service providers 140 may further perform user-level authentication and authorization if desired and/or necessary.

The application service providers 150 use the access domain 115 to offer and deliver application to end-users of the user domains 110. Examples of such applications may include gaming, video-on-demand, videoconferencing, and many other possible applications. It is however the access domain 115 that assigns IP addresses on behalf of the applications service providers to the user domains 110. If desired, the application service providers 150 can also perform authentication at the user-level and authorization if necessary. It should be noted that in the foregoing description, the expression "service providers" and "service providers domains" will be alternatively used to represent concurrently both network service providers 140 and application service providers 150, and the expression "service provider" represents one of the network service providers 140 or application service providers 150.

The decentralized node 180 is a node located in the access network 130, in relatively close proximity to the user domains 110, and which corresponds to one of the service providers 140 or 150. The decentralized node 180 may be for example a local duplicate in the access network 130 of one of the service providers (140 or 150), or a sub-unit of the corresponding service provider having only some of the capabilities thereof, or a server/router/slave under the control of the corresponding service provider. As in the example mentioned hereinabove, the service provider 140 or 150 may be a VOD server and the decentralized node 180 may comprise a movie which is in high demand. Preferably, the decentralized node 180 is capable of communicating with the access nodes 120, the access edge node 160 and the service providers (140 or 150) using for example Ethernet or IP protocol. It should be clear to those skilled in the art, that although only one decentralized node 180 is depicted in FIG. 2, many such nodes could be present in an access domain. For example, many decentralized nodes 180 could correspond to one single service provider (140 or 150), so as to offer better service to the user domains 110. Furthermore, it is also possible that many different service providers (140 or 150) each have one or a plurality of decentralized nodes 180 in the access domain, thus reducing the quantity of data traffic exchanged on the access domain, and allowing for higher quality of service. Therefore, the representation of one decentralized node 180 in the access domain 115 is being made for clarity purposes only and does not constitute a limitation of the present invention.

Figure 3:
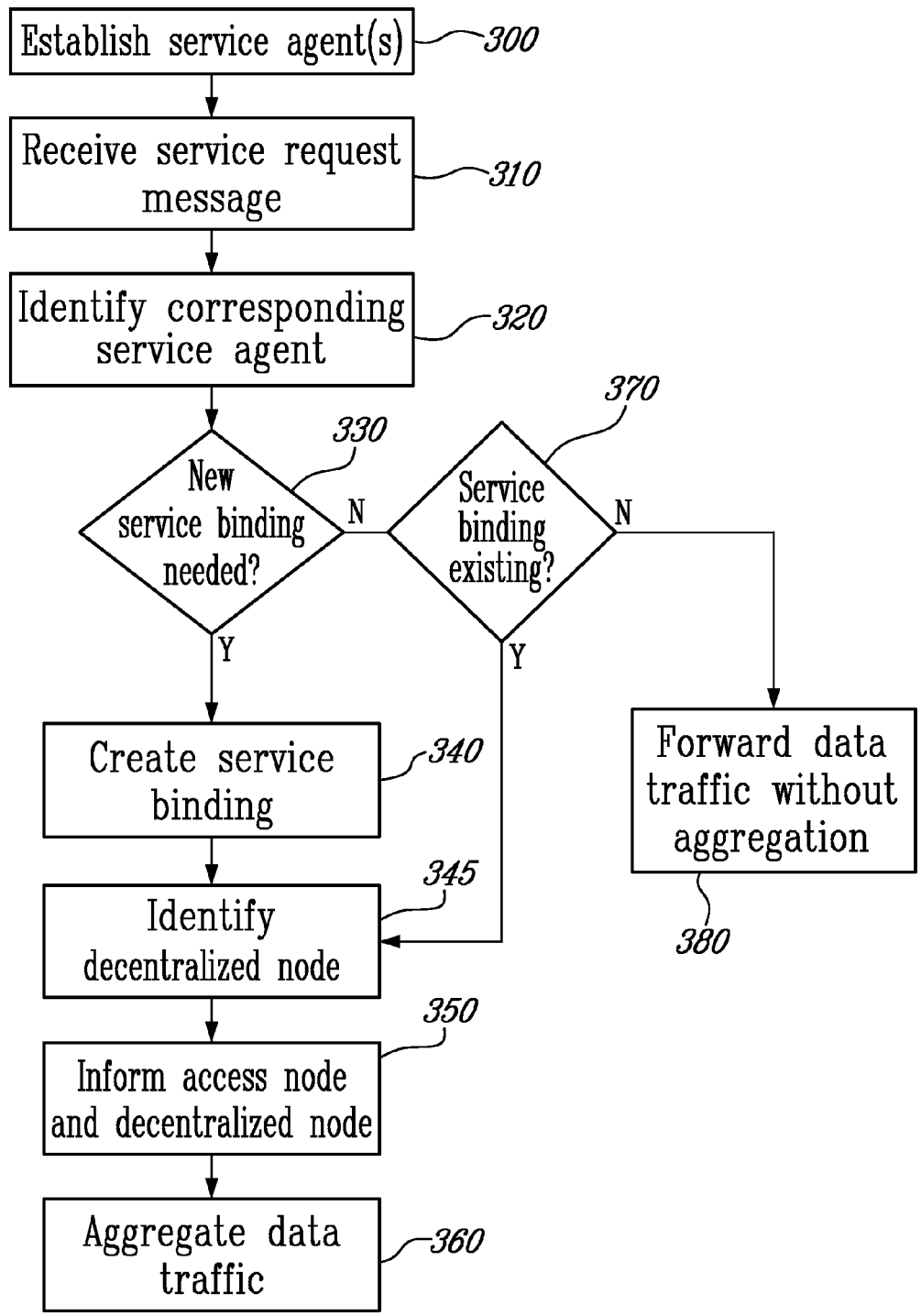
FIG. 3 is a simplified flowchart of a method for aggregating data traffic in accordance with the present invention.

Reference is now made to FIG. 3 that represents a simplified flowchart of a method for aggregating data traffic in accordance with the present invention. The present method performs data traffic aggregation over the access domain 115, which transports data traffic between the decentralized node 180 and user domains 110. The method may optionally start with a step 300 for establishing a plurality of service agents over the access domain 115. However, it should be noted that the step 300 of establishing a plurality of service agents is not to be performed each time, but rather when an access edge node 160 is introduced in the access domain 115. Afterwards, the method starts at step 310 with the receiving of a service request related message at the access edge node 160. The service request related message identifies one of the service providers and one of the user domains. The service request related message may have been generated for example through accessing by the identified user domain of a web page of the identified service provider. The method pursues with a step 320 for identifying whether one of the established service agents corresponds to the identified service providers 140 or 150. If no service agent matches the identified service provider 140 or 150, aggregation will not take place; the service request is in such case handled as in the prior art. Then, the method has a step 330 for determining whether a service binding is needed between an access node 120 responsible for providing access to the user domain identified in the service request related message and the service provider 140 or 150. If the determining step 330 is positive, the method pursues with a step 340 of creating the service binding for the received service request related message. Step 345 follows comprising identifying, by looking into the service agent, whether a decentralized node 180 corresponds to the service provider identified in the received service request message. The method pursues with step 350 of informing an access node 120 responsible for providing access to the user domain identified in the service request related message, and the decentralized node 180 identified as corresponding to the service provider identified in the service request related message, of the creation of the service binding. The access node 120 is thus informed that data traffic received from the user domain identified in the service request related message and addressed to the identified service provider is to be aggregated over the access domain in accordance with the created service binding and directed to the identified decentralized node 180. The method continues with step 360 which consists of aggregating data traffic to be transported over the access domain 115, received at the access node or at the identified decentralized node for the identified user domain and service provider, in accordance with transport relationship defined by the created service binding. In the event in step 330 that it is determined that a service binding is not needed, the method further proceeds with a step 370 for determining whether a service binding already exists for the received service request related message. A service binding may already exist for example in a case where a first and then a second user device belonging to a given user domain make subsequent requests for service from a same service provider. In the event that the outcome of the determination step 370 is that a service binding already exists, the method pursues with the step 345 of identifying the corresponding decentralized node 180, while omitting the creation of the service binding. Then, the method proceeds with informing the access node 120 and the identified decentralized node 180 of the service binding. Alternatively, if the outcome of the determination step 370 is negative, the method continues at step 380 by forwarding data traffic corresponding to the received service request related message without aggregating it over the access domain 115.

As previously mentioned, a service binding relates to a transport relationship. That transport relationship is established between one of the user domains and one of the service providers, and directly impacts the serving access node 120 and one decentralized node 180. Conceptually speaking, the creation of a service binding corresponds to adding the identified user domain to the VLAN corresponding to the service provider domain over the access domain, wherein the decentralized node 180 is on the same VLAN as the VLAN of the corresponding service provider 140 or 150. Thus, each service binding represents a tradable business entity, which guarantees delivery of the corresponding service, with the right integrity and QoS, between a specific user port of the user domain and a specific provider port of the decentralized node. Service bindings are created, managed and hosted in the access edge node, and exist in combination with the service agents 170.

Figure 4:
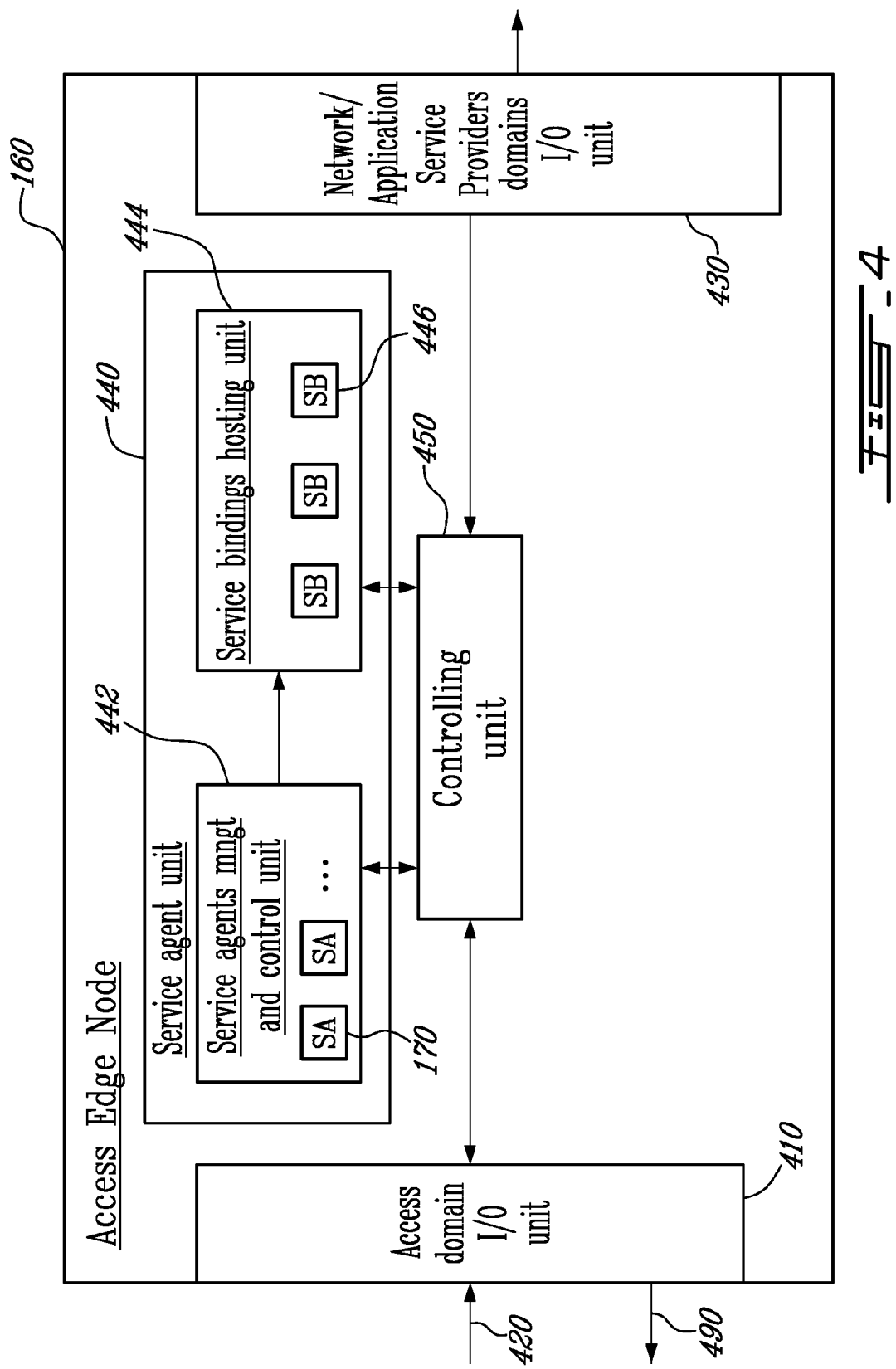
FIG. 4 is a schematic representation of an access edge node in accordance with the teachings of the present invention.

Since the service agents and service bindings are created, managed and hosted in the access edge node, reference is now made concurrently to FIGS. 2 and 4, where FIG. 4 is a schematic representation of an access edge node in accordance with the teachings of the present invention. To be able to perform the tasks of creation, management and hosting of the service agents and service bindings, the access edge node is composed of multiple elements. Because of its location in the access domain 115, the access edge node includes an input output unit including an access domain input/output unit 410 and a network/application service provider's domains input/output unit 430. The access domain input/output unit communicates with the access network 130 of the access domain 115 and with access nodes 120 and decentralized nodes 180. The network/application service provider domains input/output unit 430 communicates with the network service providers 140 and application service providers 150 over the regional network 135. Furthermore, the access edge node 160 includes a service agent unit 440 and a controlling unit 450. It is one of the input/output units 410 or 430 that receives the service request related messages 420.

The service agent unit 440 is composed of a service agents management and control unit 442 and a service bindings hosting unit 444. The service agent unit 440 keeps existing information of service agents 170 in the service agents management and control unit 442. The service agents management and control unit 442 is responsible for the creation and management of the service bindings 446. For doing so, the service agents management and control unit 442 determines when new service bindings 446 are required or can be removed, and proceeds with the creation/removal of service bindings 446. The service agents management and control unit 442 is also responsible for the adding/removal of user devices to existing service bindings. Furthermore, the service agents management and control unit 442 is responsible for ensuring synchronicity of service bindings 446 related information with access nodes and decentralized nodes with which it is interacting.

Reference to FIG. 5*a*, which represents an exemplary tabular representation of the content of the service agents management and control unit 442, is now concurrently made with FIG. 4. Each of the rows of FIG. 5*a*, at the exception of the first row, which is a header row, represents exemplary content of some of the service agents 170 managed and controlled by the service agents management and control unit 442. Each of the columns of FIG. 5*a* corresponds to specific information, maintained by the service agents management and control unit 442, for each of the service agents 170. The first column represents an identification of the service agent 170. That identification is typically a number or a service agent identifier corresponding to the service agent. In accordance to a preferred embodiment of the invention, each service agent in the access edge node has a unique service agent identifier, and corresponds to one specific service provider domain 140 or 150. The second column refers to an identification of a specific service type for the corresponding service agent. For example, in cases where one service provider domain 140 or 150 offers multiple services, each of the services offered is associated with a different service type so as to differentiate between the various services of a service provider domain. The third column identifies the preferred or necessary Quality of Service (QoS) required for properly transporting data traffic for that service provider domain and the related service type. Exemplary criteria for QoS may include delay, bit error rate, bandwidth, and preferred protocol. The fourth column indicates a port to be used in the regional network to communicate with the corresponding service provider domain. The fifth column identifies one or several decentralized nodes corresponding to the service provider domain (140 or 150), either by an IP address thereof or a physical or virtual Media Access Control (MAC) address thereof for example. If no decentralized node is provided for a specific service identified by the service agent 170, the fifth column for this service agent 170 does not contain any data. In addition to this content, the service agents management and control unit 442 includes sufficient logical software and hardware to create additional service agents and remove unnecessary service agents. It should be noted as well that even though the content of the service agents management and control unit 442 has been represented in FIG. 5*a* in the form of a table, such content is not limited thereto. The service agents management and control unit 442 could be composed of a relational database, hard coded components, microprocessors, programming library, etc . . . and the information identified in one table could be divided amongst one or multiple such alternatives.

Reference is now made to FIG. 5*b*, which represents an exemplary tabular representation of the content of the service bindings hosting unit 444, concurrently with FIG. 4. Each of the rows of FIG. 5*b*, at the exception of the header row, represents exemplary content of some of the service bindings 446 hosted in the service bindings hosting unit 444. Each of the columns of FIG. 5*b* corresponds to specific information, hosted in the service bindings hosting unit 444, for each of the service bindings 446. The first column represents an identification of a corresponding service agent, by using for example the service agent identifier of the service agent. The second column identifies the service type, as described in relation with FIG. 5*a*. The other columns represent the transport primitives for data traffic related to the service binding. More specifically, the third column may identify a user domain MAC address, a user domain IP address, or another type of network address. The fourth column consists of an identification of a port used by the user domain on the serving access node. The fifth column corresponds to a user network arbitrary local identifier used by the user domain, and may include for example implicit or explicit VLAN information. The sixth column refers to a virtual MAC or IP address of the access node serving the user domain, while the seventh column, which may or may not contain any data, depending on whether or not the decentralized node is actually used, represents a virtual MAC or IP address of the decentralized node bound to the user domain. Hence, each service binding 446 binds together one of the service agents, one of the user domains, one of the access nodes and, when appropriate, one of the decentralized nodes for providing data traffic to one user domain on behalf of service provider domain 140 or 150. It should be noted that even though the content of the service bindings hosting unit 444 has been represented in FIG. 5*b* in the form of a table, such content is not limited thereto. The service bindings hosting unit could be composed of a relational database, hard coded components, microprocessors, programming library, etc. . . .

Furthermore, the service bindings hosting unit may further contain an eight column which includes an IP address uniquely identifying the user domain or a user device thereof. That unique IP address could be provided to the user domain or user device by the access edge node through a protocol such as Dynamic Host Configuration Protocol (DHCP), using for example Broadcast mechanism that could be performed prior to the service request message. The combination of the service agent identifier and the user domain or user device unique IP address thus represents a simple and reliable way of quickly relating incoming messages to the proper service binding.

Returning now to the description of FIG. 4, the controlling unit 450 of the access edge node is responsible for determining, upon receipt of the service request related message 420, whether it corresponds to one of the service agents. For doing so, the controlling unit 450 consults the service agents management and control unit 442 to determine whether one of the service agents 170 corresponds to the service provider domain identified in the service request related message 420. In the event that one of the service agents 170 corresponds thereto, the controlling unit 450 instructs the service agents management and control unit 442 to create a service binding 446 for the received service request related message. The creation of a service binding 446 for the received service request related message 420 includes adding an entry in the service bindings hosting unit 444, in which for example:

the service agent ID (first column) corresponds to the service agent identifier for the service agent corresponding to the requested service provider domain;

the user MAC info is the user device MAC address;

the user port on access node is an identification of the port on the serving access node with which the user device is connected;

the user network context corresponds to an arbitrary local identifier provided in a field labelled "VLAN tag" of Ethernet messages to be received from the user device and corresponding a local user domain identifier;

the access node MAC is a virtual MAC address for the access node serving the user device for which the service request related message was received; and the decentralized node corresponds to the virtual MAC address of the decentralized node information bound to the user domain.

In the above example, some or all of the MAC addresses may be substituted by IP addresses or other types of network addresses.

Then, the controlling unit 450 informs the access node serving the user domain and one of the decentralized nodes corresponding to the service provider identified in the service request related message, through a service binding related message 490 sent by the access domain input/output unit 410, of the creation of the service binding 446. In the event that a service binding already exists for the service request related message 420, the controlling unit 450 informs the serving access node and the corresponding decentralized node 180 of the existing service binding through a service binding related message 490.

Figure 6:
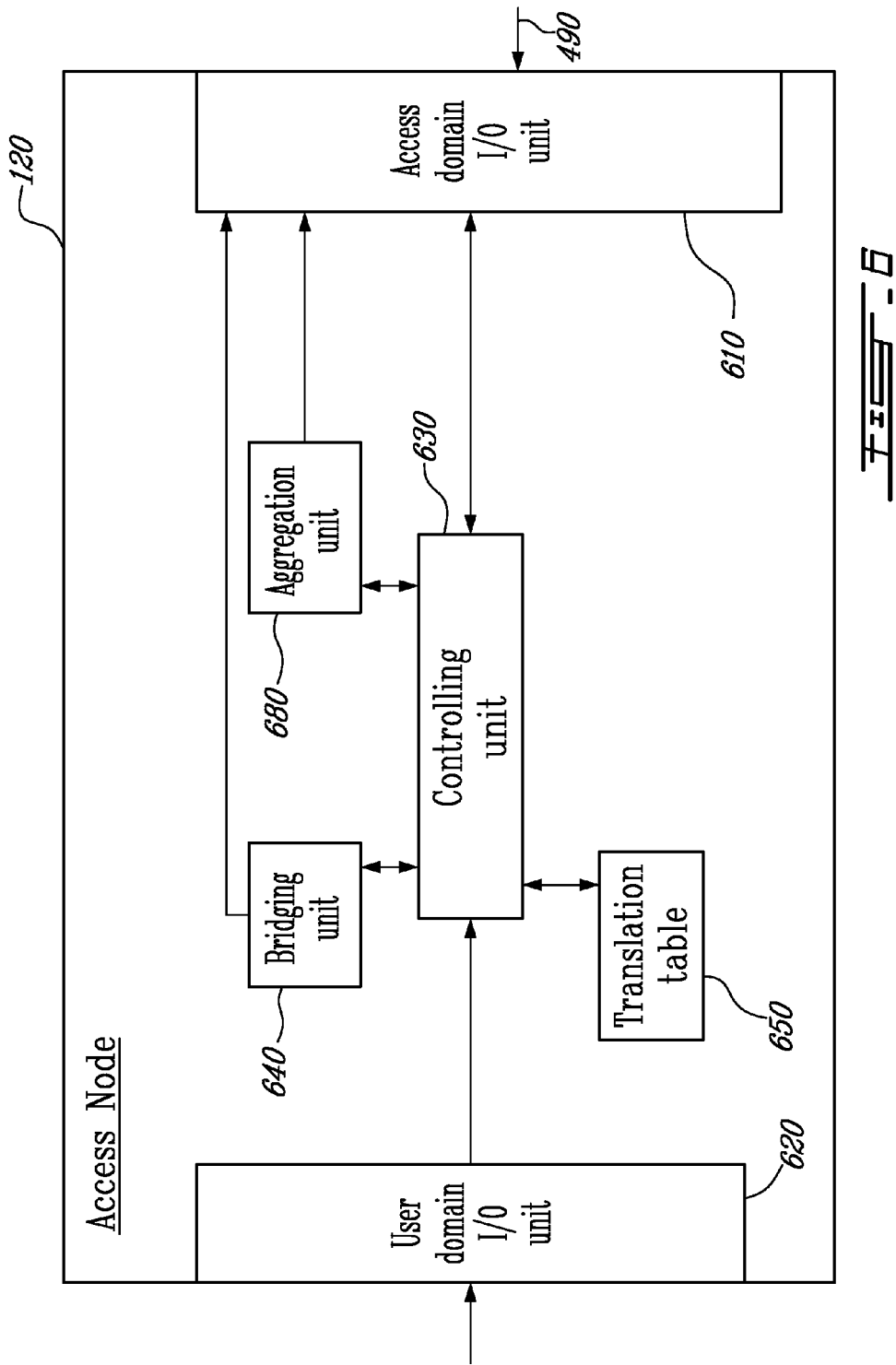
FIG. 6 is a schematic representation of an access node in accordance with the teachings of the present invention.

Reference is now made to FIG. 6, which is a schematic representation of one of the access nodes in accordance with the teachings of the present invention. Because of its location in the access domain 115, the access node 120 includes an access domain input/output unit 610 for communicating with the access network 130 of the access domain 115, with the decentralized node 180 and with the access edge node 160. The access node 120 also includes a user domains input/output unit 620 for communicating with the user domains 110. A type of messages received at the access domain input/output unit 610 is the service binding related messages 490. The service binding related messages 490 are generated by the access edge node 160, and sent over the access network 130.

Upon receipt of a service binding related message 490, the access domain input/output unit 610 forwards the received service binding related message 490 to the controlling unit 630. The controlling unit 630 extracts the content of the service binding related message 490, and determines whether there are actions to be taken. An example of service binding related message 490 is the information about the creation of a new service binding. As previously described, when the access edge node 160 determines that a new service binding is required, it proceeds with its creation and informs the access node serving the requesting user domain of the creation of the service binding. The service bindings related message 490 used in this particular instance is called for example ADD_SB (add service binding). The ADD_SB message is sent from the access edge node 160 to the access node 120, and contains information on the created service binding. The information contained in the ADD_SB message must then be incorporated into an aggregation unit 680 of the access node 120. In the hereinabove description of FIG. 3, the service binding information comprising parameters stored in the aggregation unit 680 was sent to the access node 120 at step 350.

One of the various responsibilities of the aggregation unit 680 is the hosting of service bindings related information. Service bindings related information contains specific service binding information (in the form of service agent identity and service type), identification on a port of the access edge node which received the service request related message, and local network context of the user domain, or user network context, wherein the local identifier is used as a user domain identity.

The access node 120 further handles incoming data traffic originating from/destined to user domains to which it provides access service to the access network 130. For doing so, the access node 120 further contains a translation table 650. Data traffic received at the access node 120 by either the user domain input/output unit 620 or the access domain input/output unit 610 is forwarded to the controlling unit 630. The controlling unit 630 interacts with the translation table 650. Since each service binding stored in the service bindings hosting unit 444 of the service agent unit 440 is identified by a combination of parameters (service agent identity, service type, user device MAC/IP address and access node virtual MAC/IP address), it is necessary to keep in the translation table 650 a mapping between, on one hand, the service agent identity corresponding to service agents 170 and, on the other hand, corresponding service provider domains (140 or 150) or decentralized node 180. Thus, upon receipt of downstream data traffic at the access domain input/output unit 610 having a destination address corresponding to the virtual MAC/IP address of the access node 120, the controlling unit 630 consults the translation table 650 to obtain a fast translation of the destination address and VLAN tag so as to correspond respectively to the user domain MAC/IP address and the local identifier. Such translation is required, because the user domain information is not carried over the access domain between the access edge node 160 and the access node 120. When the access node 120 receives a service request for upstream data traffic through the user domain input/output unit 620, the service request being originated from one of the user domains and intended for one of the service provider domains 140 or 150, the controlling unit 630 consults the translation table 650 to map a user domain identity received in the upstream data traffic to a user identity comprised in one of the existing service bindings. When the service binding thereby selected identifies a decentralized node 180 in addition to the service provider domain 140 or 150, either the decentralized node 180 or the service provider domain 140 or 150 may be an endpoint towards which upstream data traffic is to be aggregated. The controlling unit 630 determines which of the decentralized node 180 or the service provider domain 140 or 150 is selected as the aggregation endpoint. The determination may be based on configuration of the access node 120. The determination may alternatively be based on QoS parameters of the service binding stored in the aggregation unit 680, QoS parameters possibly being generic for any traffic or, alternatively, being specific for upstream traffic, the QoS parameters having possibly been received from the access edge node 160. In an other optional alternative, the determination of which of the decentralized node 180 or the service provider domain 140 or 150 is selected as the aggregation endpoint may be based on a packet type of the data traffic. The present invention thus enables reconciliation, in the access node 120, of the actual MAC/IP address of the user domain with the virtual MAC/IP address of the access node 120 as comprised in the service binding, thereby allowing to seamlessly aggregate data traffic over the access domain from the user domain point of view.

Reference is now made to FIG. 7, which schematically depicts the decentralized node 180 in accordance with the present invention. Once the service binding for linking the access node and the decentralized node has been created at the access edge node, the access node and the decentralized node are informed thereof by the service binding related messages 490. For aggregating data traffic over the access network 130 in accordance with the service binding created at the access edge node 160, the decentralized node 180 is equipped with various components. The decentralized node 180 includes typically an input/output unit 720, a controlling unit 730, an aggregation unit 780 and a service provider content unit 790. The input/output unit 720 receives the service binding related messages 490, and sends and receives aggregated data traffic 710 to and from the user domains 110 over the access network 130. The data traffic 710 is aggregated in accordance with the created service binding at the access edge node 160. As the decentralized node 180 corresponds to one of the service providers 140 or 150, the service provider content unit 790 thus corresponds to either one of the service provider data, or to a specific service thereof. For example, the service provider content unit 790 may include data to be distributed to the interested user domains, or may contain logic so as to provide the same service with the same level of possibilities as if handled directly by the service provider, but in closer proximity to the user domains. Similarly to the access node, the decentralized node 180 also includes an aggregation unit 780 which maintains information as to how the data traffic is to be aggregated over the access network. Thus the decentralized node manages and maintains over the access network 130 one or multiple VLAN over which the data traffic is aggregated in accordance with the established service binding, on behalf of one of the service providers. When the aggregated data traffic is received at the access node, it is disaggregated prior to its forwarding to the corresponding user domain using the information provided in the aggregation unit of the access node. More particularly, in the case where the access domain is an Ethernet network, the decentralized node provides the service agent identifier, for example, in the field known as the VLAN Tag of Unicast, Multicast and Broadcast messages, while the user domain or user device IP address is provided in IP messages embedded in the Ethernet messages. Based on the service agent identifier provided in the VLAN Tag field of Ethernet message, and on the IP address provided in the embedded IP message, the aggregation unit 680 of the access node can disaggregate the data traffic and ensure its forwarding to the corresponding user domain.

Although several preferred embodiments of the method and nodes of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

The invention claimed is:

1. A decentralized node, located in an access network, for providing a given user domain connected to the access network with content originated at cached information on behalf of a service provider domain, the decentralized node comprising:

an input/output unit for receiving and sending data traffic over the access network;

an aggregation unit for:

storing information on service bindings established over the access network, the information including for each service binding an identification of the service binding, an identity of the service provider domain, and an identity of one of a plurality of user domains, and managing and maintaining over the access network one or multiple virtual local area networks (VLAN) over which the data traffic is to be aggregated in accordance with the established service bindings;

a controlling unit for handling data traffic exchange in accordance with established service bindings by:

identifying in the aggregation unit one of the service bindings corresponding to the service provider domain, the identified service binding further including an identity of the given user domain;

identifying a corresponding one of the VLANs; and instructing the input/output unit to aggregate, over the identified VLAN, data from the local duplicate, in accordance to the identified service binding.

2. The decentralized node of claim 1, wherein the service bindings stored in the aggregation unit includes at least one of a user domain Medium Access Control (MAC) address, a user domain local network context, and a virtual access node MAC address.

3. The decentralized node of claim 1, wherein some of the service bindings are Ethernet Unicast service bindings.

4. The decentralized node of claim 1, wherein some of the service bindings are Ethernet Multicast service bindings.

5. The decentralized node of claim 1, wherein each service binding comprises transport primitives, each transport primitive including at least one of a user domain medium access control (MAC) address, a user domain local network context, and a virtual MAC address of an access node to which the user domain is connected.

6. The decentralized node of claim 1, wherein the service binding information is received from an access edge node of the access network.

7. The decentralized node of claim 6, wherein aggregating data from the local duplicate is initiated upon receipt of the service binding information.

8. The decentralized node of claim 1, wherein one VLAN corresponds to the service provider and additional VLANs correspond to additional service providers.

9. A method of providing a given user domain connected to an access network with cached information on behalf of a service provider domain, the method comprising:

storing information on service bindings established over the access network, the information including for each service binding an identification of the service binding, an identity of the service provider domain, and an identity of one of a plurality of user domains;

storing a local duplicate of at least a part of the service provider domain;

managing and maintaining over the access network one or multiple VLANs over which data traffic is to be aggregated in accordance with the established service bindings;

identifying one of the service bindings corresponding to the service provider domain, the identified service binding further including an identity of the given user domain;

identifying a corresponding one of the VLANs; and aggregating, over the identified VLAN, data from the local duplicate, in accordance to the identified service binding.

10. The method of claim 9, wherein the steps of storing, the step of managing and maintaining, the steps of identifying and the step of aggregating are executed in a decentralized node.

11. The method of claim 10, wherein the service bindings are established at an access edge node of the access network and received at the decentralized node.

12. The method of claim 11, wherein aggregating data from the local duplicate is initiated upon receipt of the service binding information.

13. The method of claim 9, wherein the data from the local duplicate is forwarded towards the given user domain through an access node providing access thereto.

* * * * *